(12) United States Patent
Kim et al.

(10) Patent No.: US 9,902,064 B2
(45) Date of Patent: Feb. 27, 2018

(54) APPARATUS FOR CONTROLLING STIFFNESS OF OUTPUT LINK IN MOVING MECHANISM

(71) Applicant: NATIONAL CANCER CENTER, Goyang-si, Gyeonggi-do (KR)

(72) Inventors: Kwang Gi Kim, Seoul (KR); Hyun Chul Jung, Goyang-si (KR); Chang Nho Cho, Goyang-si (KR)

(73) Assignee: NATIONAL CANCER CENTER, Goyang-si, Gyeonggi-do (KR)

( * ) Notice: Subject to any disclaimer, the term of this patent is extended or adjusted under 35 U.S.C. 154(b) by 0 days.

(21) Appl. No.: 15/413,450

(22) Filed: Jan. 24, 2017

(65) Prior Publication Data

US 2017/0129102 A1    May 11, 2017

Related U.S. Application Data

(63) Continuation of application No. PCT/KR2015/012483, filed on Nov. 19, 2015.

(30) Foreign Application Priority Data

Nov. 19, 2014   (KR) .................... 10-2014-0161891
Nov. 18, 2015   (KR) .................... 10-2015-0162139
Nov. 18, 2015   (KR) .................... 10-2015-0162140

(51) Int. Cl.
*B25J 17/00*   (2006.01)
*B25J 17/02*   (2006.01)
(Continued)

(52) U.S. Cl.
CPC ............. *B25J 9/1641* (2013.01); *B25J 18/00* (2013.01); *B25J 19/00* (2013.01)

(58) Field of Classification Search
CPC ....... B25J 9/1641; B25J 9/1005; B25J 19/068
See application file for complete search history.

(56) References Cited

U.S. PATENT DOCUMENTS 3,561,614 A * 2/1971 Tezuka .................. B21D 43/02
                                              198/750.11
4,659,280 A * 4/1987 Akeel ..................... B25J 9/047
                                              16/289

(Continued)

FOREIGN PATENT DOCUMENTS

JP    2009-034774 A    2/2009
JP    2013-148204 A    8/2013
(Continued)

*Primary Examiner* — Jake Cook
(74) *Attorney, Agent, or Firm* — Rabin & Berdo, P.C.

(57) ABSTRACT

A stiffness control apparatus includes a base member, an output link configured to move along a plane parallel to a surface of the base member, and at least one stiffness control unit configured to control stiffness of the output link. The at least one stiffness control unit includes a shaft including a first end and a second end, the first end being rotatably coupled to the base member, a rotating member including an elongated hole into which the second end of the shaft is movably inserted, and rotatably arranged by the shaft at a position having contact with the output link on an outer side or an inner side the output link, and an elastic member between the second end of the shaft and at least one inner wall of the elongated hole in a longitudinal direction thereof.

20 Claims, 26 Drawing Sheets

(51) Int. Cl.
*B25J 18/00* (2006.01)
*B25J 9/16* (2006.01)
*B25J 19/00* (2006.01)

(56) References Cited

U.S. PATENT DOCUMENTS 5,502,363 A * 3/1996 Tasch .................... B25J 9/12
  318/568.1
2008/0205975 A1* 8/2008 Van Ham ............. B25J 19/0016
  403/81

FOREIGN PATENT DOCUMENTS

| JP | 2014-097548 A | 5/2014 |
|----|---------------|--------|
| KR | 10-1195700 B1 | 10/2012 |
| KR | 10-1212397 B1 | 12/2012 |

* cited by examiner

APPARATUS FOR CONTROLLING STIFFNESS OF OUTPUT LINK IN MOVING MECHANISM

CROSS-REFERENCE TO RELATED APPLICATIONS

This application is a continuation of International Application No. PCT/KR2015/012483, filed Nov. 19, 2015, which is based upon and claims the benefit of priority from Korean Patent Application No. 10-2014-0161891, filed on Nov. 19, 2014, Korean Patent Application No. 10-2015-0162140, filed on Nov. 18, 2015, and Korean Patent Application No. 10-2015-0162139, filed on Nov. 18, 2015, the contents of which are incorporated herein by reference in their entirety.

BACKGROUND

1. Field

The present invention relates to an apparatus for controlling stiffness of an output link in moving mechanism.

2. Description of the Related Art

In recent years, the demand for the robot has been increased not only for industry but also for family use, and hence the research on the robot is now actively going on. A joint movement is a part of interest regarding the motion of the robot, and in the conventional technology, a complicated structure and a considerable space are required for stiffness control and positional control in rotational or translational movement of a robot joint.

The method of controlling the stiffness of the robot joint includes: e.g., installing a sensing element such as a force/torque sensor at a location close to the end portion of a robot arm having a predetermined stiffness and adjusting the torque of the joint based on a signal detected by the sensing element, thus adjusting the stiffness of the joint; and inserting a device for adjusting the stiffness in the joint of the robot, instead of employing the force/torque sensor, and adjusting the stiffness depending on the situation by using the device.

On the other hand, there has been an attempt to enhance realization of the motion and possibility of universal application of the robot in a more effective manner by adopting a structure that simulates human muscles and achieving a nonlinear characteristic with respect to a variable for adjusting the stiffness of the joint, i.e., a stiffness adjustment variable (see, for example, Korean Patent Publication No. 10-2011-0111580).

SUMMARY

According to some embodiments of the present invention, an apparatus for controlling stiffness in a moving mechanism includes a base member, an output link configured to move along a plane parallel to a surface of the base member, and at least one stiffness control unit configured to control stiffness of the output link. The at least one stiffness control unit includes a shaft including a first end and a second end, where the first end of the shaft is rotatably coupled to the base member, a rotating member including an elongated hole into which the second end of the shaft is movably inserted, and rotatably arranged by the shaft at a position having contact with the output link on an outer side or an inner side of the output link, and an elastic member between the second end of the shaft and at least one inner wall of the elongated hole in a longitudinal direction thereof.

According to some embodiments of the present invention, a moving mechanism of a robot includes a base member, an output link configured to move along a plane parallel to a surface of the base member, at least one stiffness control unit configured to control stiffness of the output link and including a shaft including a first end and a second end, where the first end of the shaft is rotatably coupled to the base member, a rotating member including an elongated hole into which the second end of the shaft is movably inserted, and rotatably arranged by the shaft at a position having contact with the output link on an outer side or an inner side the output link, and an elastic member between the second end of the shaft and at least one inner wall of the elongated hole in a longitudinal direction thereof, and a contact unit configured to be coupled to the output link.

According to some embodiments of the present invention, an apparatus for controlling stiffness in a moving mechanism including a first member and a second member configured to make a relative movement with respect to the first member includes a shaft including a first end and a second end, the first end being rotatably coupled to the first member, a rotating member including an elongated hole into which the second end of the shaft is movably inserted, and rotatably arranged by the shaft at a position having contact with the second member on an outer side or an inner side of the second member, and an elastic member between the second end of the shaft and at least one inner wall of the elongated hole in a longitudinal direction thereof. The apparatus is configured to maximize the stiffness of the second member at a first position where the elongated hole is located in a first direction perpendicular to a moving direction of the second member by blocking a movement of the second member, to allow the movement of the second member at a position where the elongated hole is located in a direction other than the first direction and to change the stiffness of the second member by a change of an elastic force of the elastic member generated by a relative movement of the shaft along the elongated hole, and to minimize the stiffness of the second member at a position where the elongated hole is located in a second direction parallel to the moving direction of the second member.

DETAILED DESCRIPTION OF THE PREFERRED EMBODIMENTS

Figure 1A:
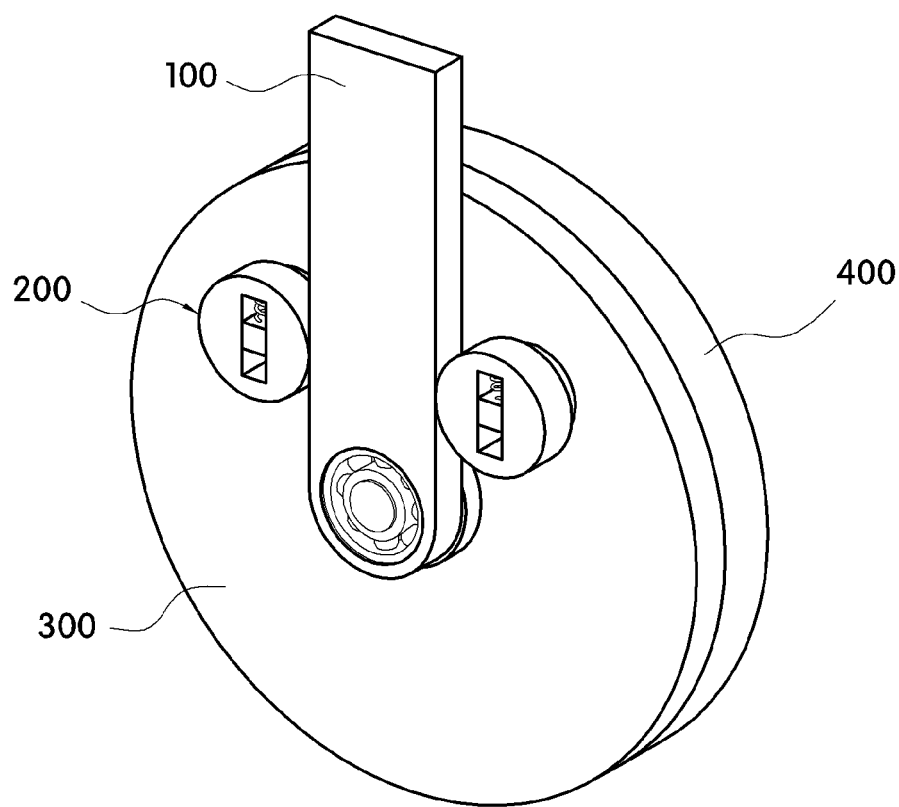
FIG. 1A is a perspective view of an external-type stiffness control apparatus according to some embodiments of the present invention applied to a rotational motion actuator.

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

When employing the force/torque sensor to adjust the stiffness of a robot joint, not only the algorithm for adjusting the stiffness is complicated and setting of the minimum value and the maximum value of the stiffness is limited due to a problem of stability, but also it is difficult to commercialize a robot due to high manufacturing cost.

Figure 1B:
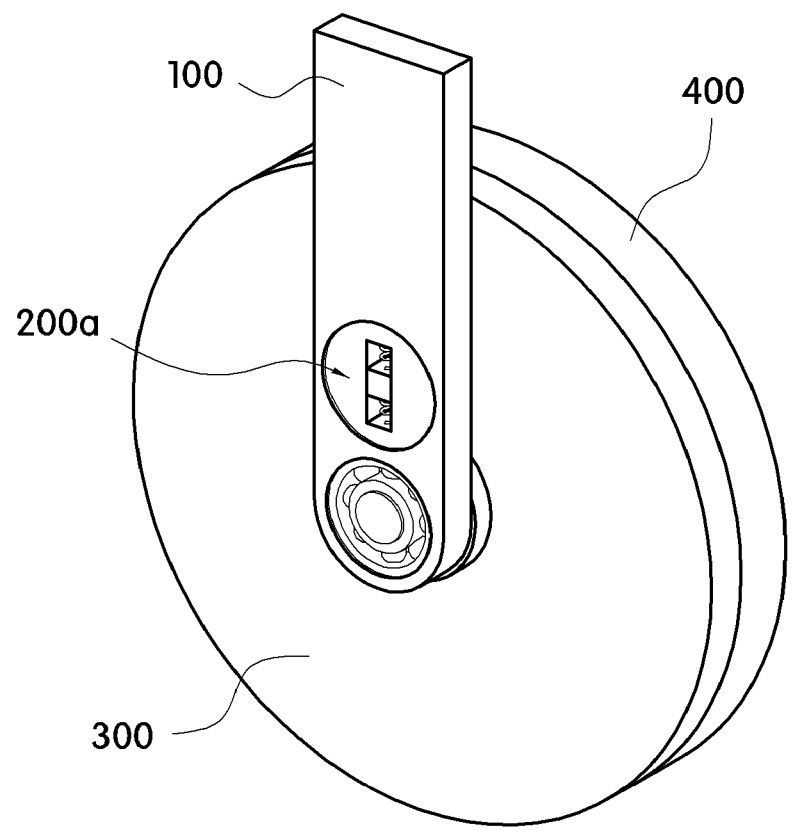
FIG. 1B is a perspective view of an internal-type stiffness control apparatus according to some embodiments of the present invention applied to a rotational motion actuator.
Figure 2A:
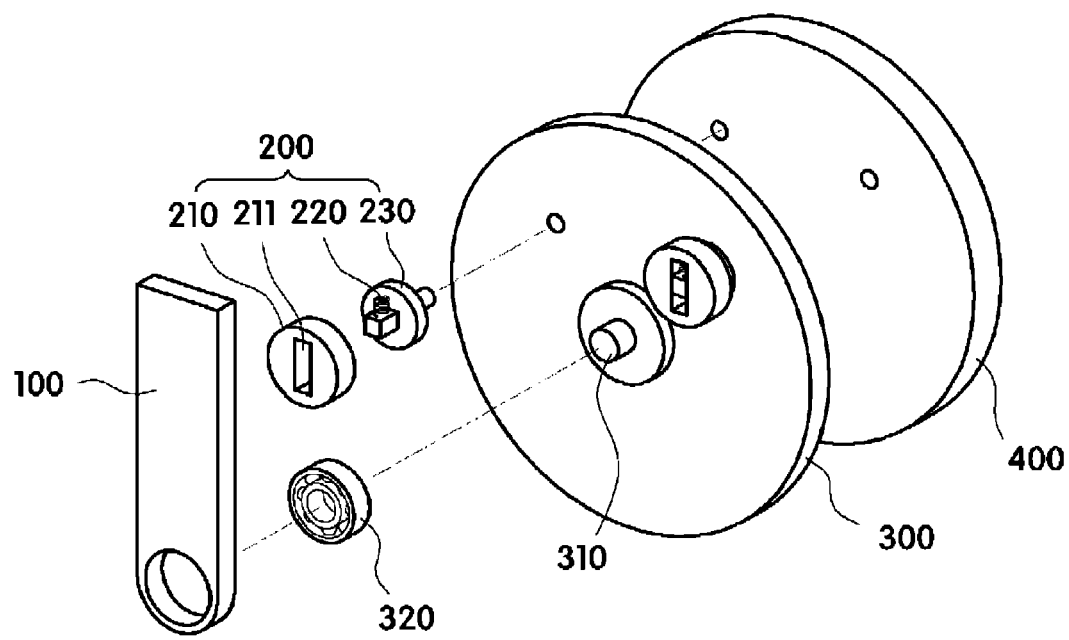
FIG. 2A is an exploded perspective view of the external-type stiffness control apparatus shown in FIG. 1A.
Figure 2B:
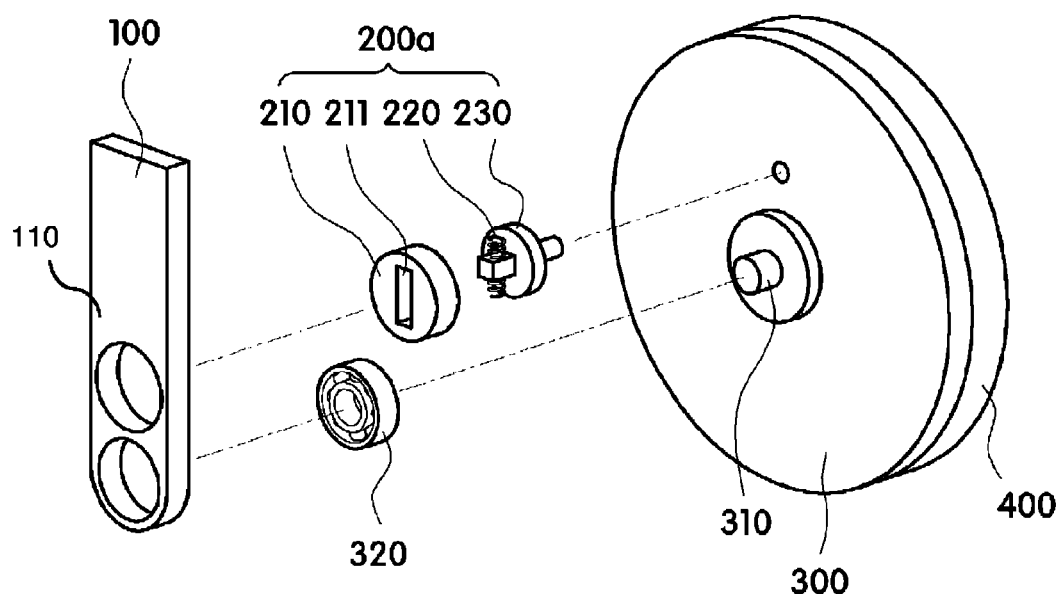
FIG. 2B is an exploded perspective view of the internal-type stiffness control apparatus shown in FIG. 1B.

FIG. 1A is a perspective view of an external-type stiffness control apparatus according to some embodiments of the present invention applied to a rotational motion actuator, FIG. 1B is a perspective view of an internal-type stiffness control apparatus according to some embodiments of the present invention applied to a rotational motion actuator, FIG. 2A is an exploded perspective view of the external-type stiffness control apparatus shown in FIG. 1A, and FIG. 2B is an exploded perspective view of the internal-type stiffness control apparatus shown in FIG. 1B.

As shown in FIGS. 1A to 2B, the stiffness control apparatus according to some embodiments of the present invention includes an output link (output member) 100, a stiffness control unit 200/200a, a base plate (base member) 300, and a rotation mechanism connecting unit 400.

The stiffness control unit 200/200a includes a rotating member 210, an elongated hole 211 formed in the rotating member 210, an elastic member 220, and a shaft 230. The stiffness control unit 200/200a is arranged on an outer side or an inner side of the output link 100. The base plate 300 includes a main shaft 310 and a bearing 320.

The stiffness control apparatus according to some embodiments of the present invention adjusts the stiffness of the output link 100. In some embodiments, the output link 100 works as a robot arm, a robot leg, or the like, through which an end effector such as a gripper can be attached.

As shown in FIGS. 1A and 2A, the stiffness control unit 200 is rotatably arranged on the outer side of the output link 100 having contact with the output link 100 on both sides of the output link 100 along the longitudinal direction of the output link 100. A rotation angle of the stiffness control unit 200 with respect to the output link 100 is adjusted by a direction of rotation of the rotating member 210, thus controlling the stiffness of the output link 100 at the time of rotational movement of the output link 100.

As shown in FIG. 2B, the output link 100 includes a circular hole 110 for accommodating the stiffness control unit 200a, such that the stiffness control unit 200a is rotatably arranged on the inner side of the output link 100 having contact with the output link 100. A rotation angle of the stiffness control unit 200a with respect to the output link 100 is adjusted by a direction of rotation of the rotating member 210, thus controlling the stiffness of the output link 100 at the time of rotational movement of the output link 100.

The rotating member 210 is arranged on each outer side of the output link 100 having contact with the output link 100 or with a slight space therebetween or on the inner side of the output link 100 having contact with the output link 100 or with a slight space therebetween. The rotating member 210 includes the elongated hole 211 at substantially the center portion thereof.

A cross-sectional outline of the rotating member 210 perpendicular to the longitudinal direction of the shaft 230 is in a shape of circle, ellipse with the major axis parallel to the longitudinal direction of the elongated hole 211, or polygon.

When the cross-sectional outline of the rotating member 210 perpendicular to the longitudinal direction of the shaft 230 is circular or elliptical, the stiffness control unit 200/200a controls the stiffness of the output link 100 at the time of rotational movement of the output link 100 in a continuous manner according to the rotation angle of the rotating member.

When the cross-sectional outline of the rotating member 210 perpendicular to the longitudinal direction of the shaft 230 is polygonal, the stiffness control unit 200/200a controls the stiffness of the output link 100 at the time of rotational movement of the output link 100 in a stepwise manner according to the rotation of the rotating member for each face of the polygon. In this case, the stiffness control unit 200/200a may include a clicking unit (not shown) to stop the rotation of the rotating member for each face of the polygon.

The shaft 230 is movably (slidably) inserted in the elongated hole 211, and rotates the rotating member 210. The shaft 230 makes a relative movement with respect to the rotating member 210 by relative sliding of the shaft 230 and the elongated hole 211 along the longitudinal direction of the elongated hole 211. In some embodiments, the shaft 230 is rotatably fixed to the base plate 300.

The elastic member 220 is a spring or a member having elastic force, such as silicone, rubber, or the like, which is inserted into the elongated hole 211 between the shaft 230 and an inner wall of the rotating member 210 in the longitudinal direction.

When the rotating member 210 is rotated, a relative angle of the elongated hole 211 with respect to the output link 100 is changed depending on the rotation direction of the rotating member 210, and the stiffness of the output link 100 is adjusted based on a compressed or expanded status of the elastic member 220.

In FIGS. 1A and 2A, the rotating member 210 arranged on the outer side of the output link 100 is rotated, and in FIGS. 1B, and 2B, the rotating member 210 is rotated in the circular hole 110 formed on the inner side of the output link 100, to control the stiffness of the output link 100.

In some embodiments, as shown in FIGS. 1A to 2B, a coil spring is used as the elastic member 220, and by compressing or expanding the coil spring with the relative sliding of the shaft 230 along the elongated hole 211, the stiffness of the output link 100 is changeable.

The rotation mechanism connecting unit 400 generates a rotational force. One plane of the base plate 300 is coupled with the output link 100 and at least one rotating member 210, and the other plane of the base plate 300 is coupled with the rotation mechanism connecting unit 400. The rotating force generated by the rotation mechanism connecting unit 400 is transferred to the output link 100 via the base plate 300 to control a position of the output link 100 (position control of the output link 100).

The base plate 300 includes the main shaft 310 and the bearing 320 fitted with the main shaft 310, and the output link 100 is coupled to the base plate 300 through the main shaft 310 and the bearing 320.

The rotation mechanism connecting unit 400 includes a mechanism (not shown) for separately rotating a plurality of shafts 230.

Therefore, the position of the output link 100 is controlled by the rotation of the base plate 300, and when the output link 100 is rotated by a predetermined angle around the main shaft 310 by an external force, a damping effect is generated due to the elastic force of the elastic member 220. Thus, the stiffness of the output link 100 is adjusted.

Figure 3A:
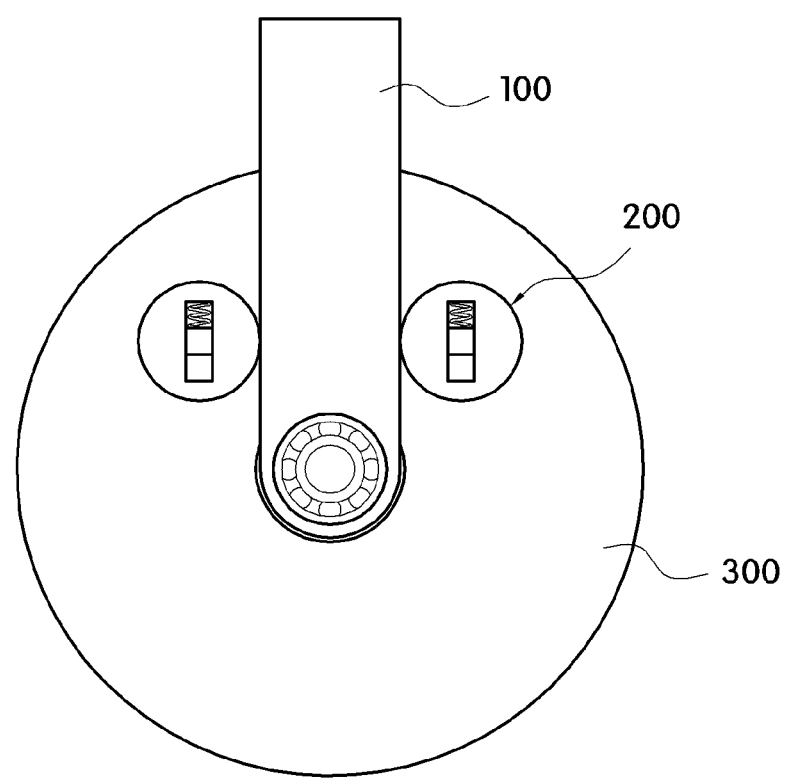
FIG. 3A is a plan view of the external-type stiffness control apparatus shown in FIG. 1A exhibiting the maximum stiffness status.
Figure 3B:
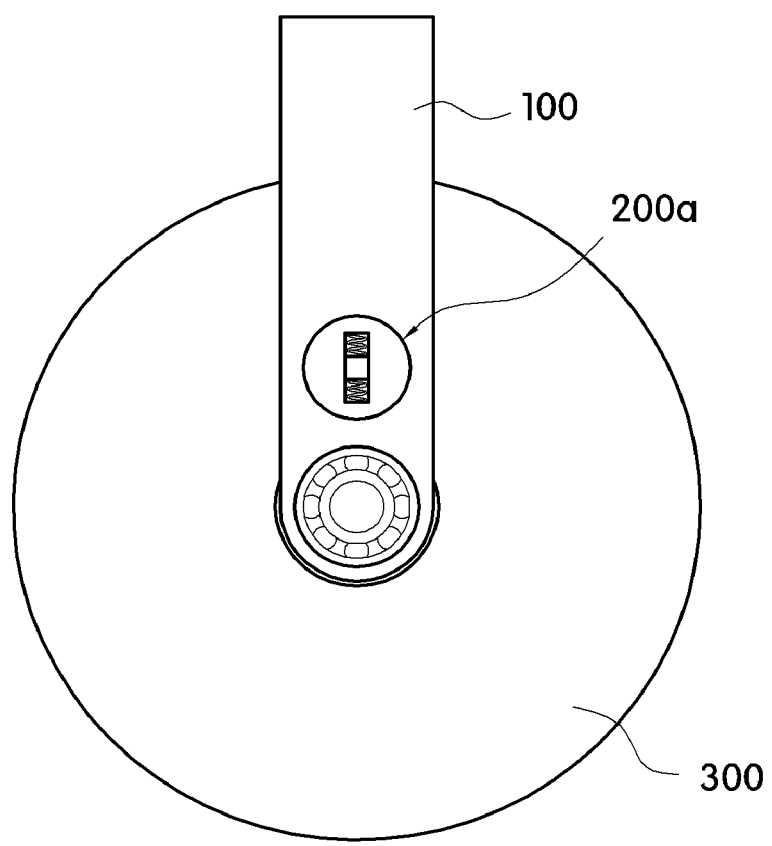
FIG. 3B is a plan view of the internal-type stiffness control apparatus shown in FIG. 1B exhibiting the maximum stiffness status.
Figure 4A:
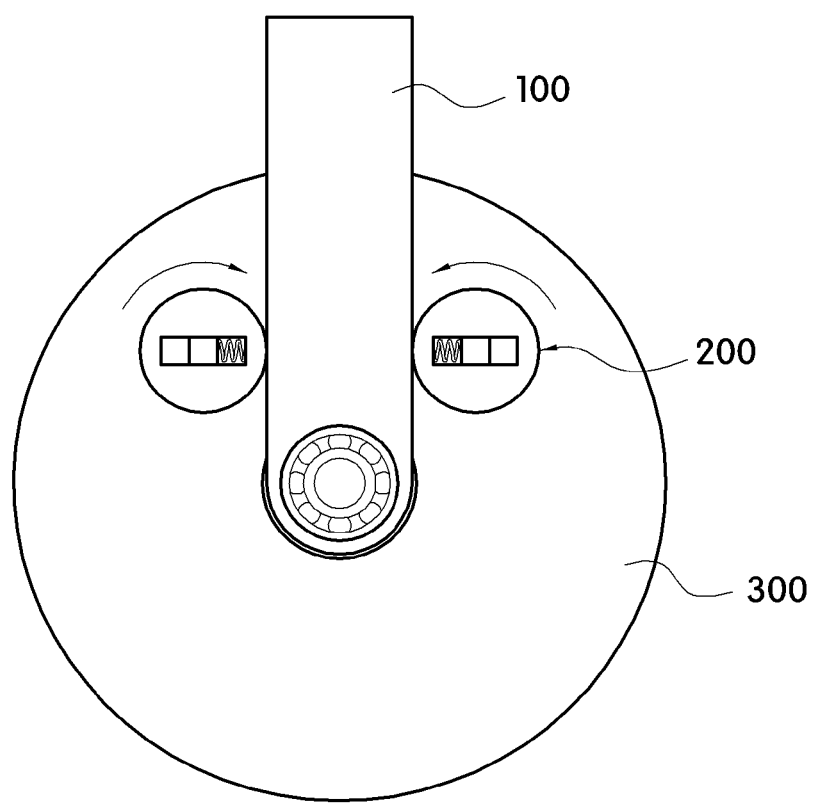
FIG. 4A is a plan view of the external-type stiffness control apparatus shown in FIG. 1A exhibiting the minimum stiffness status.
Figure 4B:
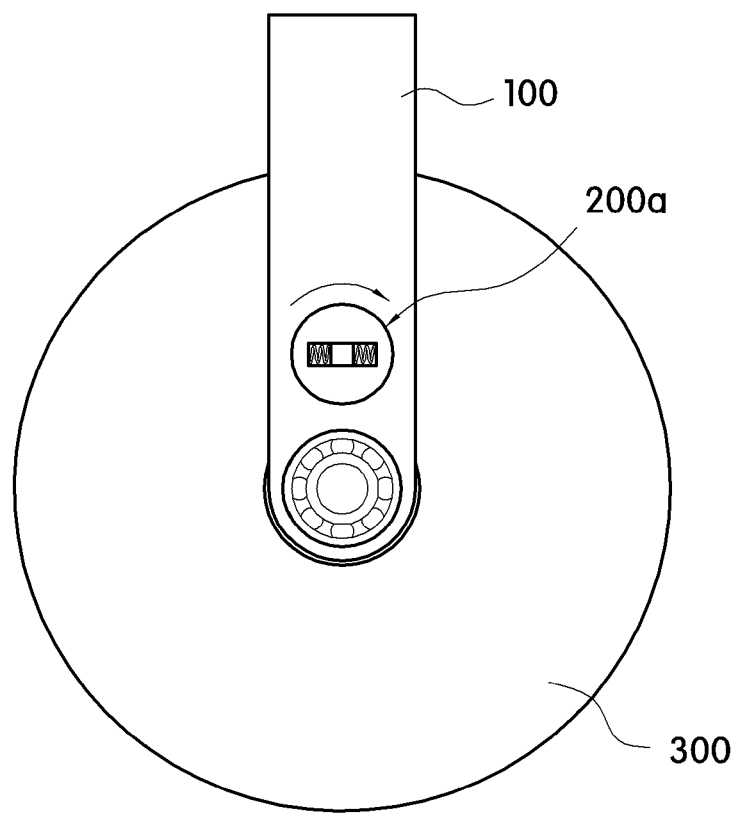
FIG. 4B is a plan view of the internal-type stiffness control apparatus shown in FIG. 1B exhibiting the minimum stiffness status.
Figure 5A:
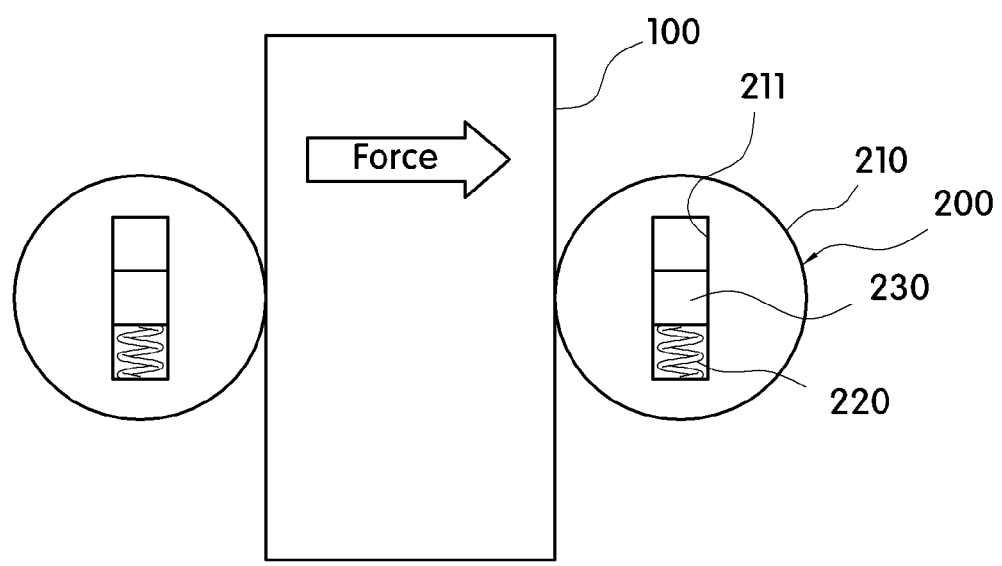
FIG. 5A is a schematic diagram of the external-type stiffness control apparatus for describing the action in the maximum stiffness status shown in FIG. 3A.
Figure 5B:
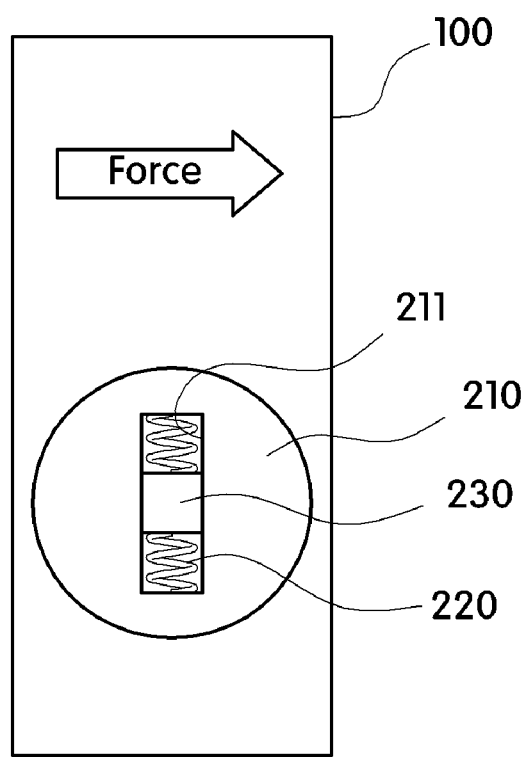
FIG. 5B is a schematic diagram of the internal-type stiffness control apparatus for describing the action in the maximum stiffness status shown in FIG. 3B.
Figure 6A:
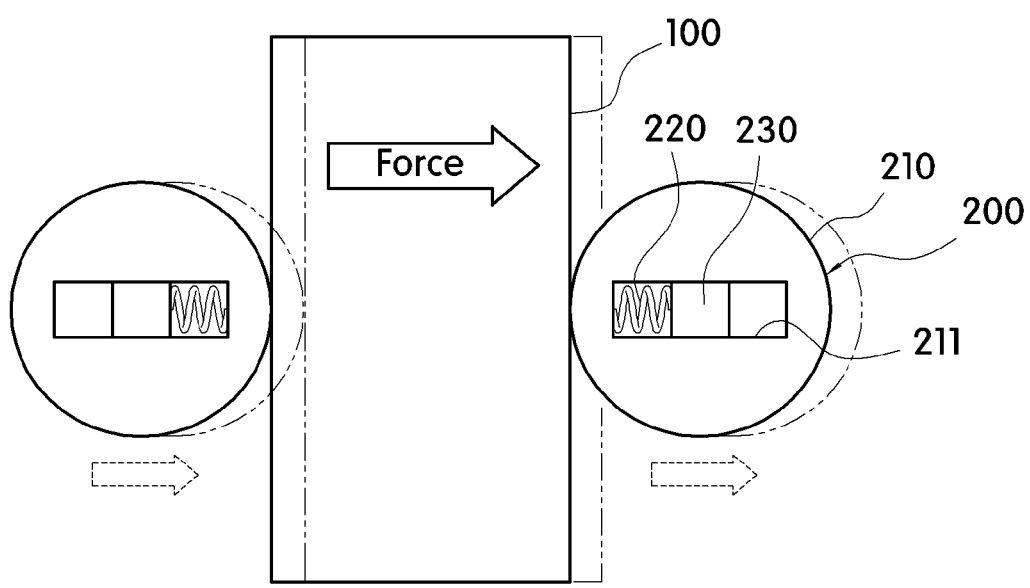
FIG. 6A is a schematic diagram of the external-type stiffness control apparatus for describing the action in the minimum stiffness status shown in FIG. 4A.
Figure 6B:
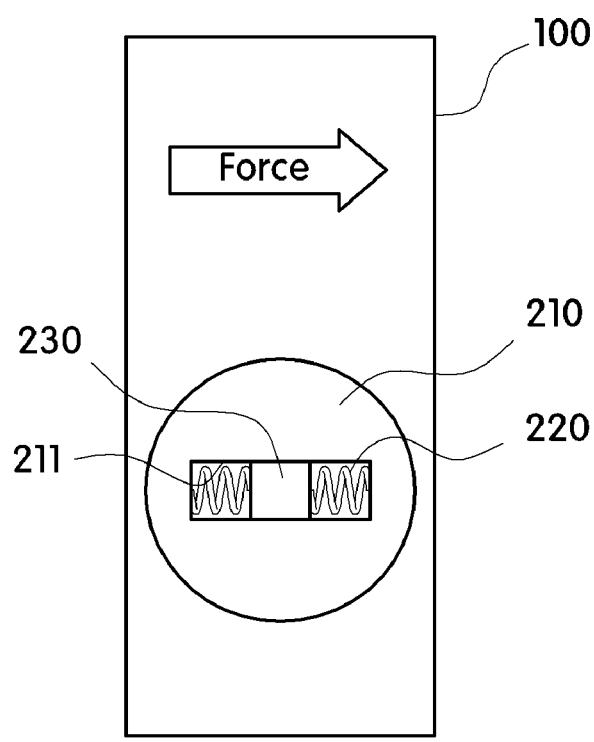
FIG. 6B is a schematic diagram of the internal-type stiffness control apparatus for describing the action in the minimum stiffness status shown in FIG. 4B.

FIG. 3A is a plan view of the external-type stiffness control apparatus shown in FIG. 1A exhibiting the maximum stiffness status, FIG. 3B is a plan view of the internal-type stiffness control apparatus shown in FIG. 1B exhibiting the maximum stiffness status, FIG. 4A is a plan view of the external-type stiffness control apparatus shown in FIG. 1A exhibiting the minimum stiffness status, FIG. 4B is a plan view of the internal-type stiffness control apparatus shown in FIG. 1B exhibiting the stiffness status, FIG. 5A is a schematic diagram of the external-type stiffness control apparatus for describing the action in the stiffness status shown in FIG. 3A, FIG. 5B is a schematic diagram of the internal-type stiffness control apparatus for describing the action in the maximum stiffness status shown in FIG. 3B, FIG. 6A is a schematic diagram of the external-type stiffness control apparatus for describing the action in the minimum stiffness status shown in FIG. 4A, and FIG. 6B is a schematic diagram of the internal-type stiffness control apparatus for describing the action in the minimum stiffness status shown in FIG. 4B.

As shown in FIGS. 3A to 6B, in the stiffness control unit 200/200a, the relative angle of the elongated hole 211 is changed with respect to the output link 100 according to the rotation direction of the rotating member 210, by which the stiffness of the output link 100 is controlled.

In a first state in which the elongated hole 211 is located in a first direction that is perpendicular to the moving direction of the output link 100, the output link 100 exhibits the maximum stiffness, and in a second state in which the elongated hole 211 is located in a second direction that is perpendicular to the first direction and parallel to the moving direction of the output link 100, the output link 100 exhibits the minimum stiffness.

As shown in FIGS. 3A and 3B, in the maximum stiffness status, the rotating member 210 is rotated such that the elongated hole 211 is in the first direction perpendicular to the rotating direction of the output link 100, which is parallel to the longitudinal direction of the output link 100, where the rotating member 210 is fixed to disable the output link 100 to rotate.

On the other hand, as shown in FIGS. 4A and 4B, in the minimum stiffness status, the rotating member 210 is rotated such that the elongated hole 211 is in the second direction parallel to the rotating direction of the output link 100, which is perpendicular to the longitudinal direction of the output link 100, where the elastic member 220 intervenes between the inner wall of the elongated hole 211 and the shaft 230 in the rotating direction of the output link 100. In this case, the output link 100 experiences the minimum stiffness due to the damping action of the elastic member 220.

As shown in FIGS. 5A and 6A, the mechanism of the stiffness control apparatus according to some embodiments of the present invention rotates the rotating members 210 arranged on the outer sides of the output link 100 by a desired angle, and controls the stiffness of the output link 100 by the elastic force of the elastic member 220 embedded in the elongated hole 211 inside the rotating member 210.

As shown in FIGS. 5B and 6B, the mechanism of the stiffness control apparatus according to some embodiments of the present invention rotates the rotating members 210 arranged on the inner side of the output link 100 by a desired angle, and controls the stiffness of the output link 100 by the elastic force of the elastic member 220 embedded in the elongated hole 211 inside the rotating member 210.

The elastic member 220 is inserted between the inner wall of the rotating member 210 and the shaft 230 to generate the elastic force depending on the rotation angle of the rotating member 210, by which the stiffness of the output link 100 is controlled.

When the cross-sectional outline of the rotating member 210 perpendicular to the longitudinal direction of the shaft 230 is in a shape of ellipse with the major axis parallel to the longitudinal direction of the elongated hole 211, rotating the rotating member 210 from the first direction toward the second direction (clockwise or counterclockwise), the rotating member 210 is allowed to move by relatively sliding the shaft 230 along the elongated hole 211, which pre-presses the output link 100. This allows the stiffness control unit 200 to keep the contact status with the output link 100 with a constant stiffness even when the output link 100 moves.

In some embodiments, by rotating the rotating member 210 to an arbitrary direction between the first direction and the second direction, the stiffness of the output link 100 can be controlled to an arbitrary stiffness in a range from the minimum stiffness to the maximum stiffness.

When the elongated hole 211 is located in the first direction by the rotation of the rotating member 210, the elastic member 220 is disabled to generate the elastic force, and hence, even when an external force is applied to the output link 100, the output link 100 is disabled to rotate around the main shaft 310, which causes the output link 100 to receive the external force as it is.

On the other hand, when the elongated hole 211 is located in a direction other than the first direction by the rotation of the rotating member 210, when an external force is applied to the output link 100, the rotating member 210 is allowed to move in the direction of the external force. The output link 100 then rotates around the main shaft 310 by a predetermined angle, which generates the elastic force of the elastic member 220 to obtain the damping effect.

Figure 7A:
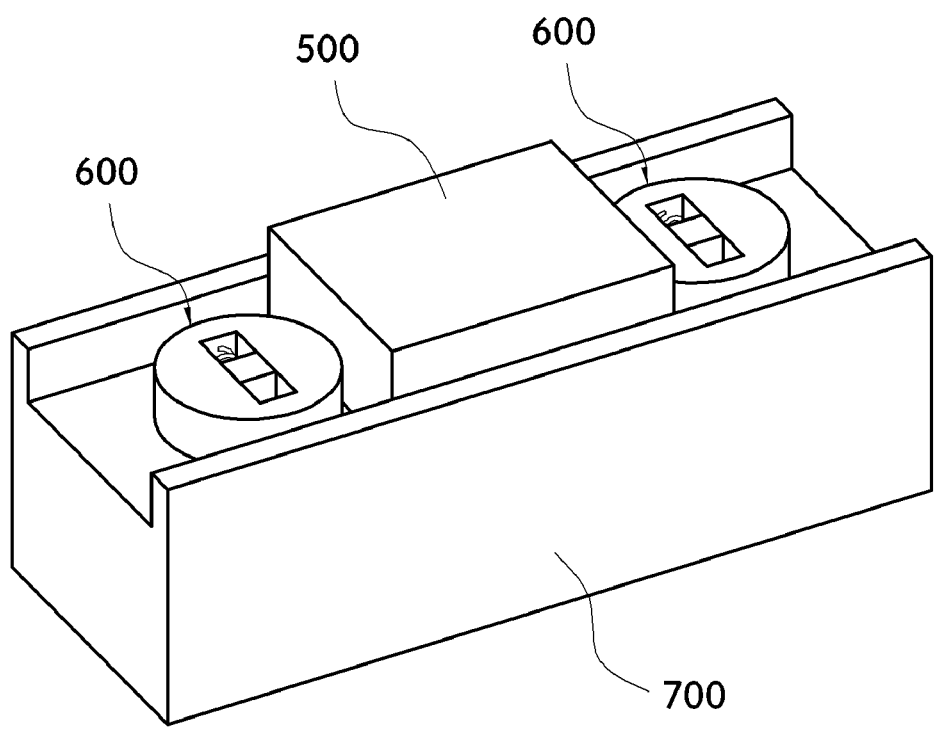
FIG. 7A is a perspective view of an external-type stiffness control apparatus according to some embodiments of the present invention applied to a translational motion actuator.
Figure 7B:
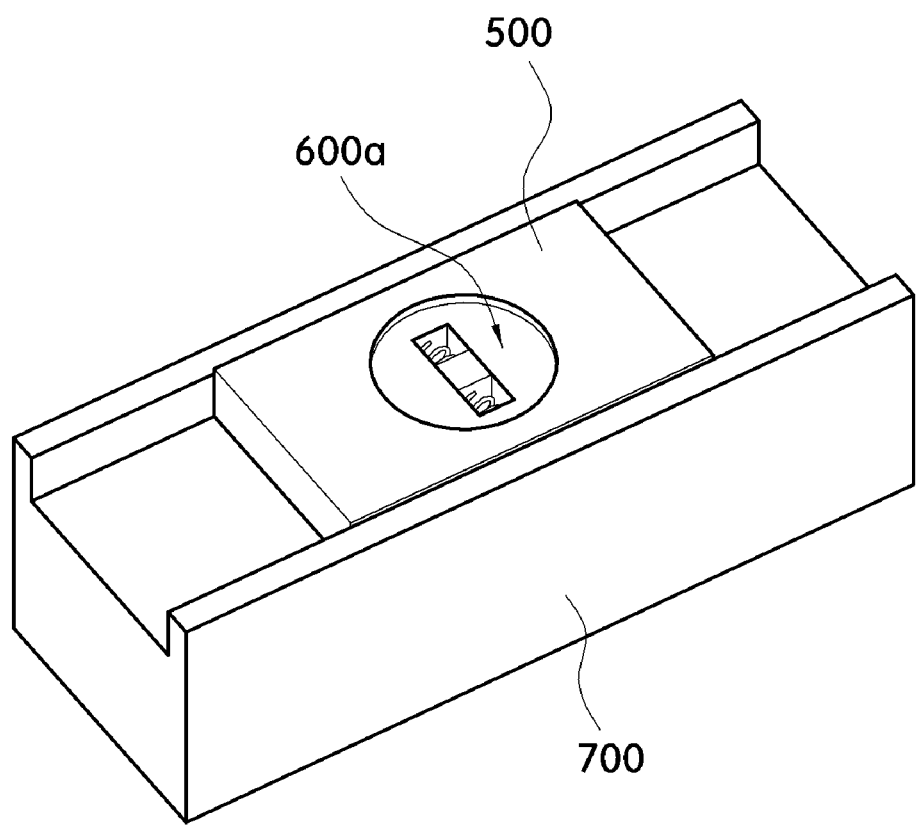
FIG. 7B is a perspective view of an internal-type stiffness control apparatus according to some embodiments of the present invention applied to a translational motion actuator.
Figure 8A:
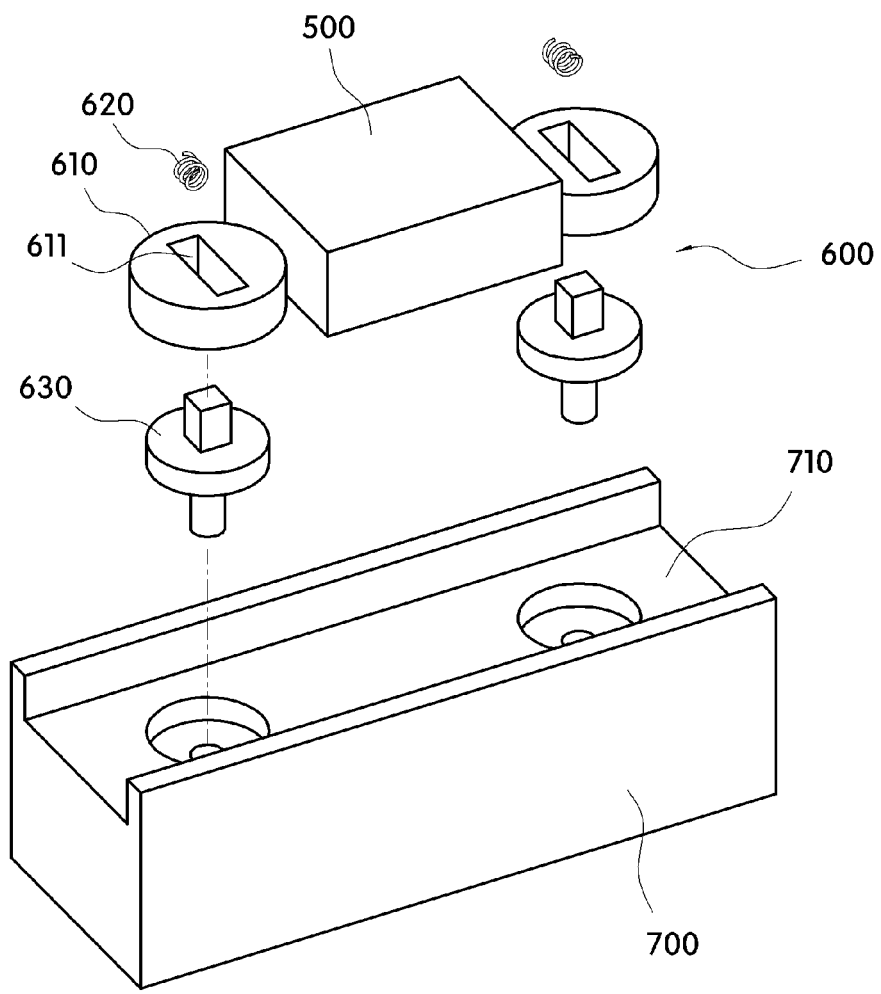
FIG. 8A is an exploded perspective view of the external-type stiffness control apparatus shown in FIG. 7A.
Figure 8B:
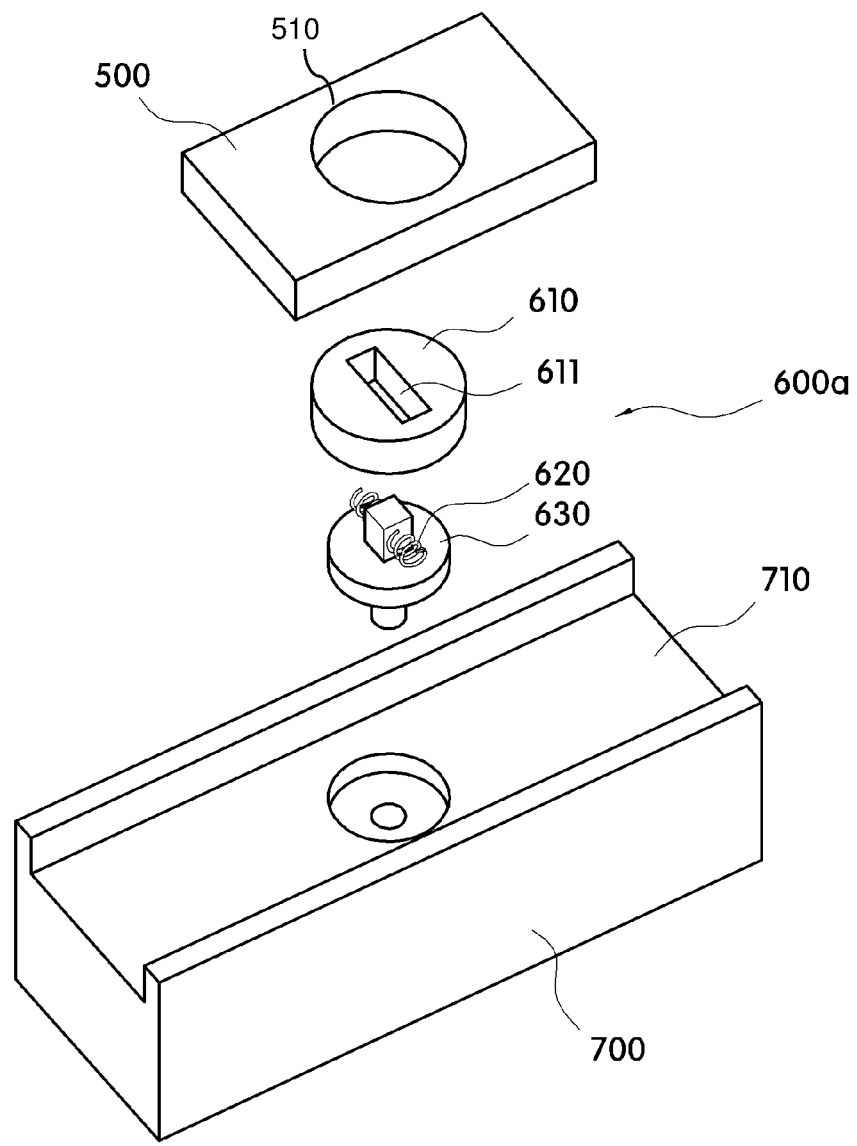
FIG. 8B is an exploded perspective view of the internal-type stiffness control apparatus shown in FIG. 7B.
Figure 9A:
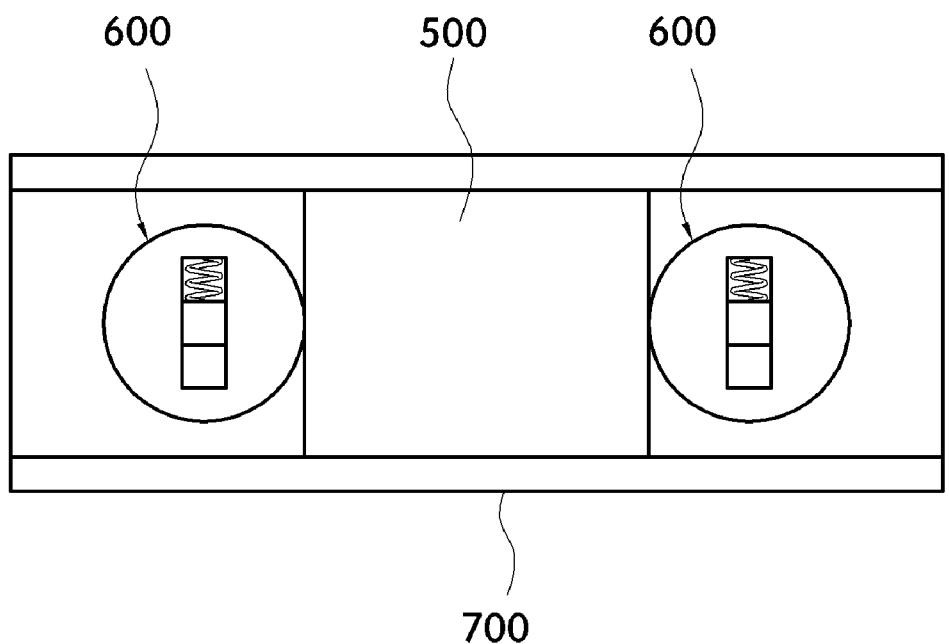
FIG. 9A is a plan view of the external-type stiffness control apparatus shown in FIG. 7A exhibiting the maximum stiffness status.
Figure 9B:
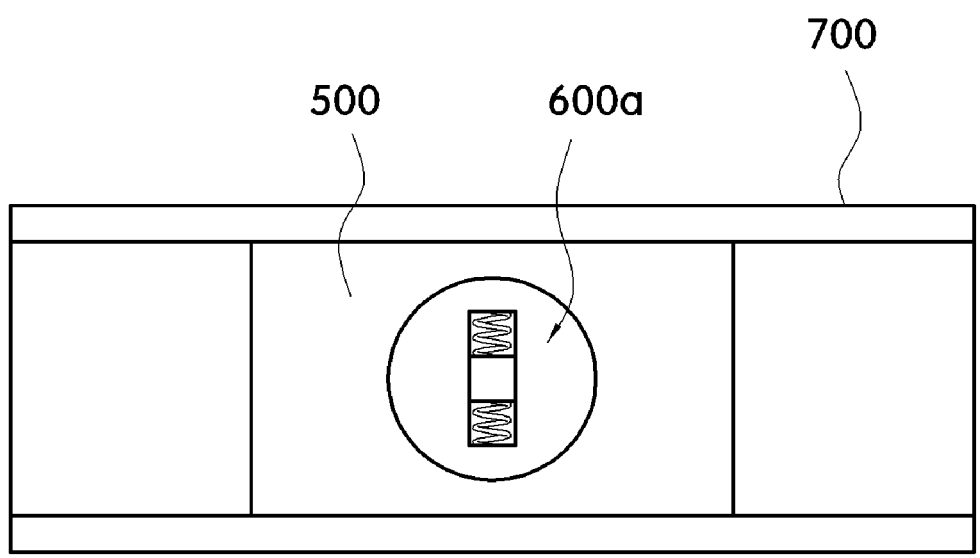
FIG. 9B is a plan view of the internal-type stiffness control apparatus shown in FIG. 7B exhibiting the maximum stiffness status.
Figure 10A:
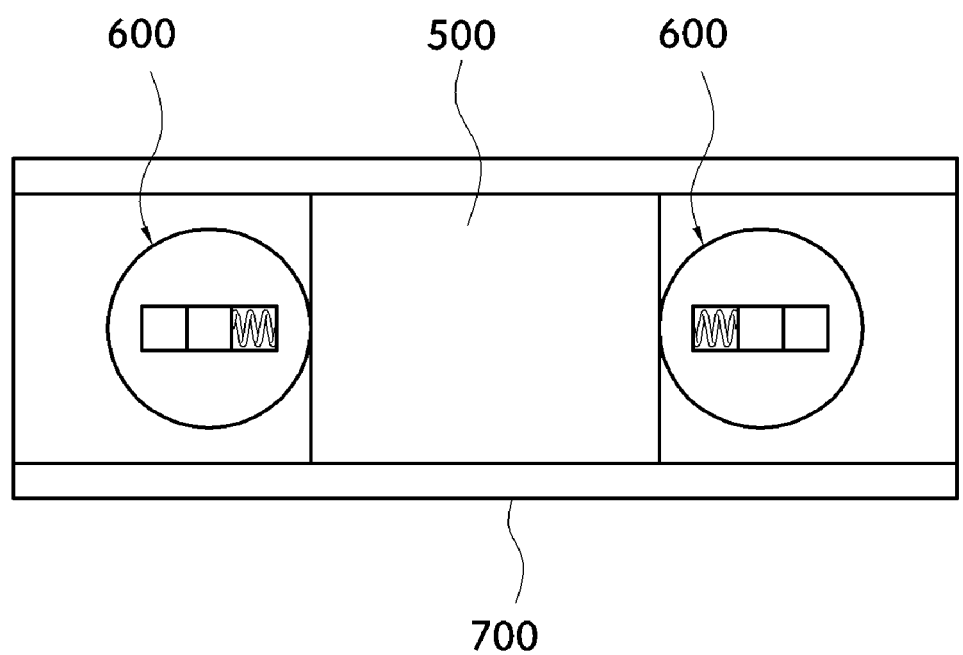
FIG. 10A is a plan view of the external-type stiffness control apparatus shown in FIG. 7A exhibiting the minimum stiffness status.
Figure 10B:
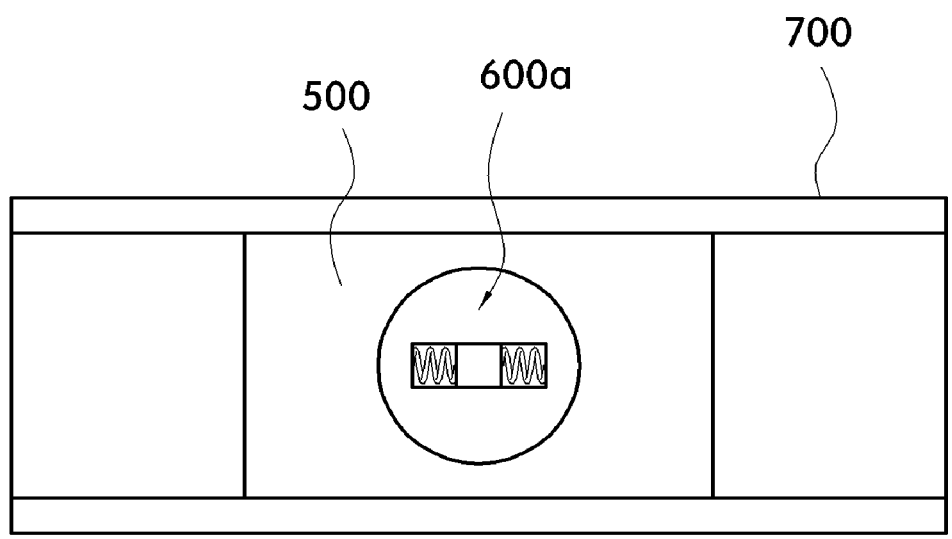
FIG. 10B is a plan view of the internal-type stiffness control apparatus shown in FIG. 7B exhibiting the minimum stiffness status.

FIG. 7A is a perspective view of an external-type stiffness control apparatus according to some embodiments of the present invention applied to a translational motion actuator, FIG. 7B is a perspective view of an internal-type stiffness control apparatus according to some embodiments of the present invention applied to a translational motion actuator, FIG. 8A is an exploded perspective view of the external-type stiffness control apparatus shown in FIG. 7A, FIG. 8B is an exploded perspective view of the internal-type stiffness control apparatus shown in FIG. 7B, FIG. 9A is a plan view of the external-type stiffness control apparatus shown in FIG. 7A exhibiting the maximum stiffness status, FIG. 9B is a plan view of the internal-type stiffness control apparatus shown in FIG. 7B exhibiting the maximum stiffness status, FIG. 10A is a plan view of the external-type stiffness control apparatus shown in FIG. 7A exhibiting the minimum stiffness status, and FIG. 10B is a plan view of the internal-type stiffness control apparatus shown in FIG. 7B exhibiting the minimum stiffness status.

As shown in FIGS. 7A to 8B, the stiffness control apparatus according to some embodiments of the present invention as the translational motion actuator includes an output link (output member) 500, a stiffness control unit 600/600a, and a base frame (base member) 700.

The stiffness control unit 600/600a includes a rotating member 610, an elongated hole 611 formed in the rotating member 610, an elastic member 620, and a shaft 630.

As shown in FIGS. 7A and 8A, the base frame 700 includes a recess 710 for tightly accommodating the output link 500 and the stiffness control unit 600 arranged on each outer side of the output link 500 in the longitudinal direction of the base frame 700. The output link 500 is arranged along the recess 710 to be movable along a translational direction parallel to the longitudinal direction of the base frame 700.

As shown in FIGS. 7B and 8B, the base frame 700 includes the recess 710 for tightly accommodating the output link 500 and the stiffness control unit 600a arranged on the inner side of the output link 500. The output link 500 is arranged along the recess 710 to be movable along a translational direction parallel to the longitudinal direction of the base frame 700.

That is, the stiffness control unit 600 arranged on the outer side of the output link 500 adjusts the stiffness of the output link 500. At this moment, as shown in FIG. 7A, the stiffness control unit 600 makes contact with the sides of the output link 500. A relative angle of the stiffness control unit 600 is adjusted with respect to the output link 500 according to the rotation direction, based on which the stiffness of the output link 500 is adjusted.

The stiffness control unit 600a arranged on the inner side of the output link 500 adjusts the stiffness of the output link 500. At this moment, as shown in FIG. 7B, the stiffness control unit 600a makes contact with the inner side of the output link 500. A relative angle of the stiffness control unit 600a is adjusted with respect to the output link 500 according to the rotation direction, based on which the stiffness of the output link 500 is adjusted.

In the stiffness control unit 600, the rotating member 610 is arranged to make contact with the sides of the output link 500. The rotating member 610 includes the elongated hole 611 at substantially the center portion.

A cross-sectional outline of the rotating member 610 perpendicular to the longitudinal direction of the shaft 630 is in a shape of circle, ellipse with the major axis parallel to the longitudinal direction of the elongated hole 611, or polygon.

The shaft 630 is movably (slidably) inserted in the elongated hole 611, and rotates the rotating member 610. The shaft 630 makes a relative movement with respect to the rotating member 610 by sliding in the elongated hole 611 along the longitudinal direction of the elongated hole 611. In some embodiments, the shaft 630 is rotatably fixed to the base frame 700.

The elastic member 620 is a spring or a member having elastic force, such as silicone, rubber, or the like, which is inserted into the elongated hole 611 between the shaft 630 and an inner wall of the rotating member 610 in the longitudinal direction.

Therefore, when the rotating member 610 is rotated, a relative angle of the elongated hole 611 with respect to the output link 500 is changed depending on the rotation direction of the rotating member 610, and the stiffness of the output link 500 is adjusted based on a compressed status of the elastic member 620.

In some embodiments, as shown in FIGS. 7A to 8B, a coil spring is used as the elastic member 620, and by compressing or expanding the coil spring with the relative sliding of the shaft 630 along the elongated hole 611, the stiffness of the output link 500 is changeable.

The mechanism of the stiffness control apparatus according to some embodiments of the present invention is capable of varying the stiffness of the output link 500 that moves in the translational direction.

FIG. 9A is a plan view of the external-type stiffness control apparatus shown in FIG. 7A exhibiting the maximum stiffness status, FIG. 9B is a plan view of the internal-type stiffness control apparatus shown in FIG. 7B exhibiting the maximum stiffness status, FIG. 10A is a plan view of the external-type stiffness control apparatus shown in FIG. 7A exhibiting the minimum stiffness status, and FIG. 10B is a plan view of the internal-type stiffness control apparatus shown in FIG. 7B exhibiting the minimum stiffness status.

As shown in FIGS. 9A and 10A, the output link 500 is movable in a sliding manner in the translational direction along the base frame 700. The rotating member 610 makes contact with each outer side of the output link 500. The rotating member 610 is movable by relatively sliding the shaft 630, and the elastic member 620 is embedded in the elongated hole 611.

The stiffness of the output link 500 can be varied by rotating the rotating members 610. In some embodiments, the base frame 700 accommodating the output link 500 and the stiffness control unit 600 on each side of the output link 500 includes a driving mechanism such as one or more actuator for rotating the shaft 630, through which the rotating member 610 can be rotated.

As shown in FIGS. 9B and 10B, the output link 500 includes a circular hole 510 for accommodating the stiffness control unit 600a, such that the stiffness control unit 600a is rotatably arranged on the inner side of the output link 500 to make contact with the output link 500. The output link 500 is movable in a sliding manner in the translational direction along the base frame 700. The rotating member 610 arranged in the inner side of the output link 500 makes contact with the output link 500. The rotating member 610 is movable by relatively sliding the shaft 630, and the elastic member 620 is embedded in the elongated hole 611.

The stiffness of the output link 500 can be varied by rotating the rotating member 610. In some embodiments, the base frame 700 accommodating the output link 500 and the stiffness control unit 600a on the inner side of the output link 500 includes a driving mechanism such as one or more actuator for rotating the shaft 630, through which the rotating member 610 can be rotated.

Therefore, the stiffness control apparatus according to some embodiments of the present invention is capable of varying the stiffness of the output link that makes a translational movement, which can be sued in an independent manner, and when this mechanism is applied to an actuator, can also be used as a variable stiffness actuator. This enables a moving mechanism to perform its operation in a stable manner by effectively and easily controlling the stiffness of the output link both in the rotational movement and the translational movement.

Figure 11:
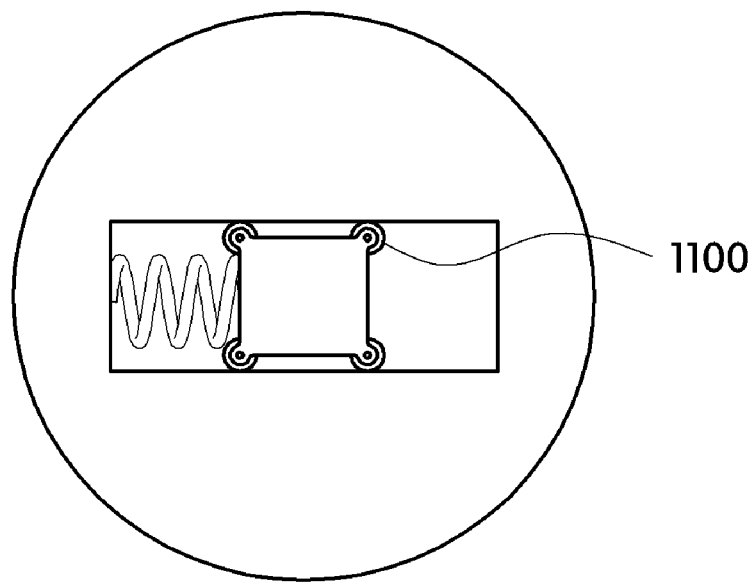
FIG. 11 is a plan view of a stiffness control unit according to some embodiments of the present invention showing a roller provided at each corner of a shaft.

FIG. 11 is a plan view of a stiffness control unit according to some embodiments of the present invention showing a roller 1100 provided at each corner of the shaft.

As describe above, the shaft of the stiffness control apparatus according to some embodiments of the present invention is inserted into the elongated hole to rotate the rotating member. At the same time, the shaft is configured to move along the elongated hole by relatively sliding along the elongated hole. Therefore, the roller 1100 provided at each corner of the shaft guides the shaft to smoothly move along the elongated hole.

Figure 12:
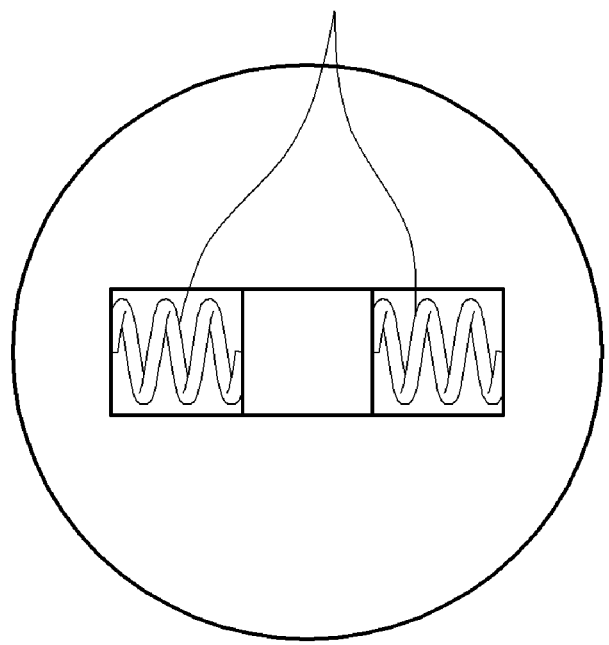
FIG. 12 is a plan view of a stiffness control unit according to some embodiments of the present invention showing an elastic member provided on each side of the shaft.

FIG. 12 is a plan view of a stiffness control unit according to some embodiments of the present invention showing an elastic member provided on each side of the shaft.

As describe above, the stiffness control apparatus according to some embodiments of the present invention includes a pair of elastic members between each inner wall and the shaft. When the elongated hole is located in a direction other than the direction perpendicular to the moving direction of the output link by the rotation of the rotating member, the elastic force of the elastic member is generated to control the stiffness of the output link. The elastic member of each stiffness control apparatus is compressed or expanded depending on the direction of the elongated hole, by which the elastic force is generated.

As shown in FIG. 12, the elastic member is provided on each side of the shaft, and when the elastic force is generated, one elastic member is expanded and the other elastic member is compressed, thus providing a more precise stiffness control.

Figure 13:
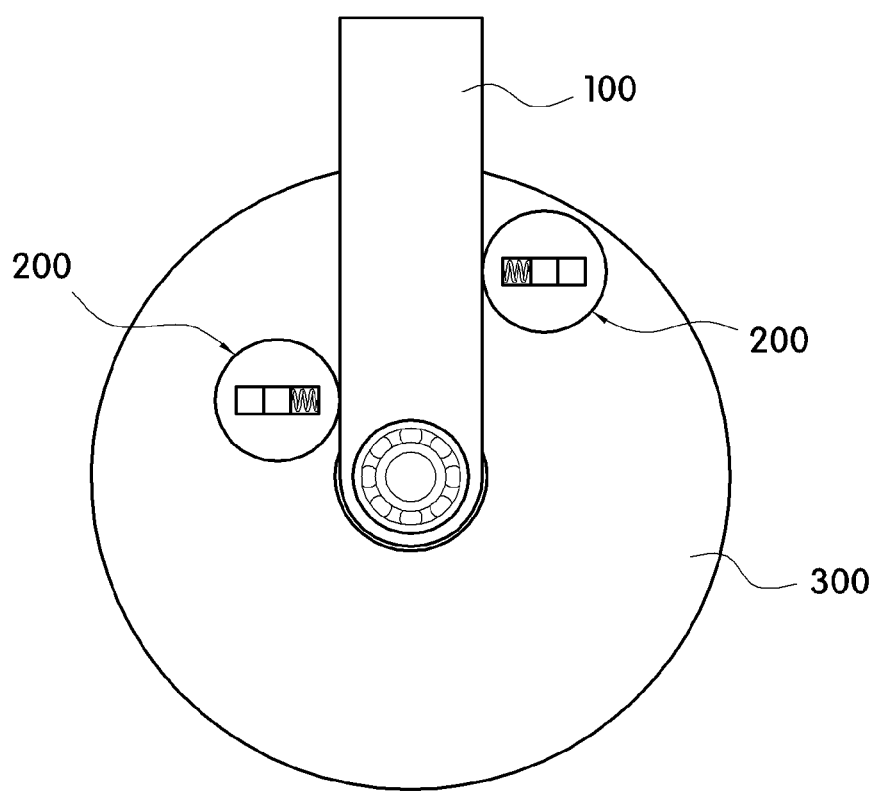
FIG. 13 is a plan view of an external-type stiffness control apparatus according to some embodiments of the present invention including a plurality of stiffness control units at asymmetric positions on the outer side of the output link.

FIG. 13 is a plan view of an external-type stiffness control apparatus according to some embodiments of the present invention including a plurality of stiffness control units at asymmetric positions with different heights on the outer side of the output link.

In the embodiments described above, two stiffness control units are arranged on the outer side of the output link one for each side with the same distance from the main shaft in a symmetric manner with respect to the main shaft. However, in some embodiments, as shown in FIG. 13, the two stiffness control units are respectively arranged at different distances from the main shaft in an asymmetric manner. This is useful when an external force is biased to either side of the output link or when the stiffness needs to be controlled in an asymmetric manner.

In some embodiments, a plurality of stiffness control units is arranged on each side of the output link, and the number of the stiffness control units to be arranged is set appropriately depending on the dynamic range of the stiffness to be controlled.

Figure 14:
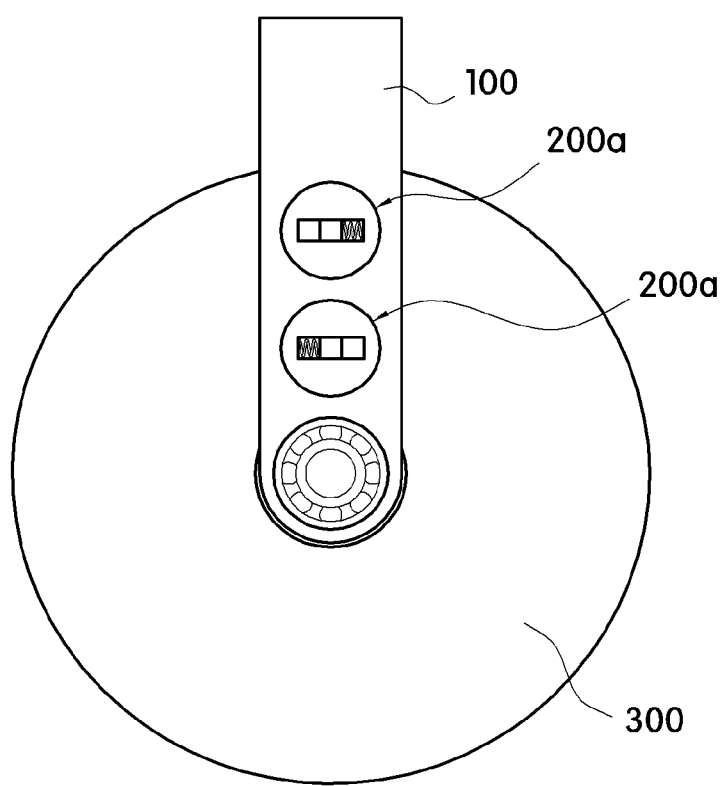
FIG. 14 is a plan view of an internal-type stiffness control apparatus according to some embodiments of the present invention including a plurality of stiffness control units on the inner side of the output link.

FIG. 14 is a plan view of an internal-type stiffness control apparatus according to some embodiments of the present invention including a plurality of stiffness control units on the inner side of the output link.

When a single stiffness control unit is arranged on the inner side of the output link 100, as the output link 100 is rotated in both directions around the main shaft 310, the elastic member 220 needs to be provided on each side of the shaft 230 to control the stiffness in both directions. However, when a plurality of stiffness control units is arranged on the inner side of the output link 100 as shown in FIG. 14, a stiffness control unit having the elastic member 220 on either side of the shaft 230 can be used by two or more stiffness control units in opposite directions. In this case, it is a matter of course that a plurality of stiffness control units each having the elastic members 220 on both sides of the shaft 230 can be used.

Figure 15:
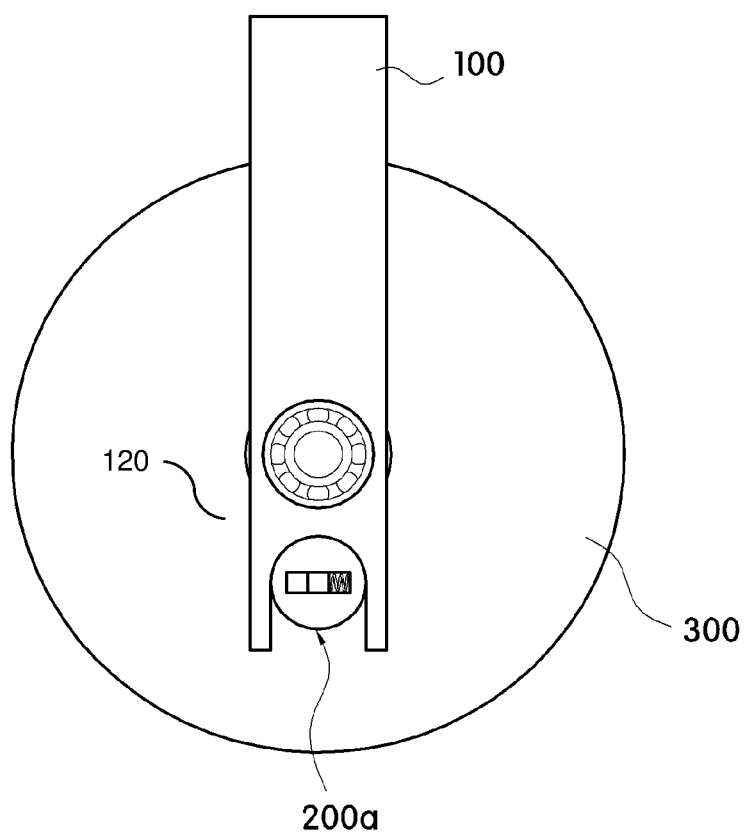
FIG. 15 is a plan view of a stiffness control apparatus according to some embodiments of the present invention including a stiffness control unit at an end portion of an output link.

FIG. 15 is a plan view of a stiffness control apparatus according to some embodiments of the present invention including a stiffness control unit at an end portion of the output link.

In the example shown in FIG. 15, the output link 100 includes a concave portion 120 on the near side of the main shaft 310 to accommodate the stiffness control unit 200a. In this specification, the stiffness control unit 200a arranged in such a concave portion of the output link 100 is also referred to as the internal type. This structure can obtain a leverage effect to increase the maximum force applied to the output link, which increases the dynamic range of the stiffness control.

Figure 16:
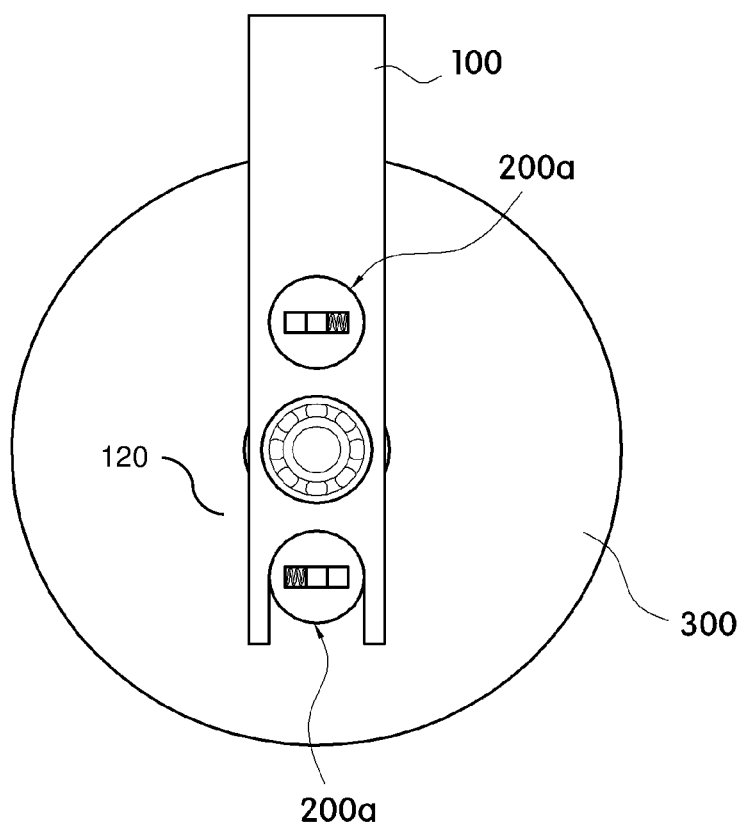
FIG. 16 is a plan view of a stiffness control apparatus according to some embodiments of the present invention including a plurality of stiffness control units on both sides with respect to a main shaft.

FIG. 16 is a plan view of a stiffness control apparatus according to some embodiments of the present invention including a plurality of stiffness control units on both sides with respect to the main shaft.

The structure shown in FIG. 16 includes two stiffness control units respectively arranged on the near side (a side of the output link close to the main shaft) and the far side (a side opposite to the near side with respect to the main shaft).

This structure can make the dynamic range of the stiffness control even broader by arranging the stiffness control unit on the opposite side with respect to the main shaft 310 with the structure shown in FIG. 15.

Figure 17:
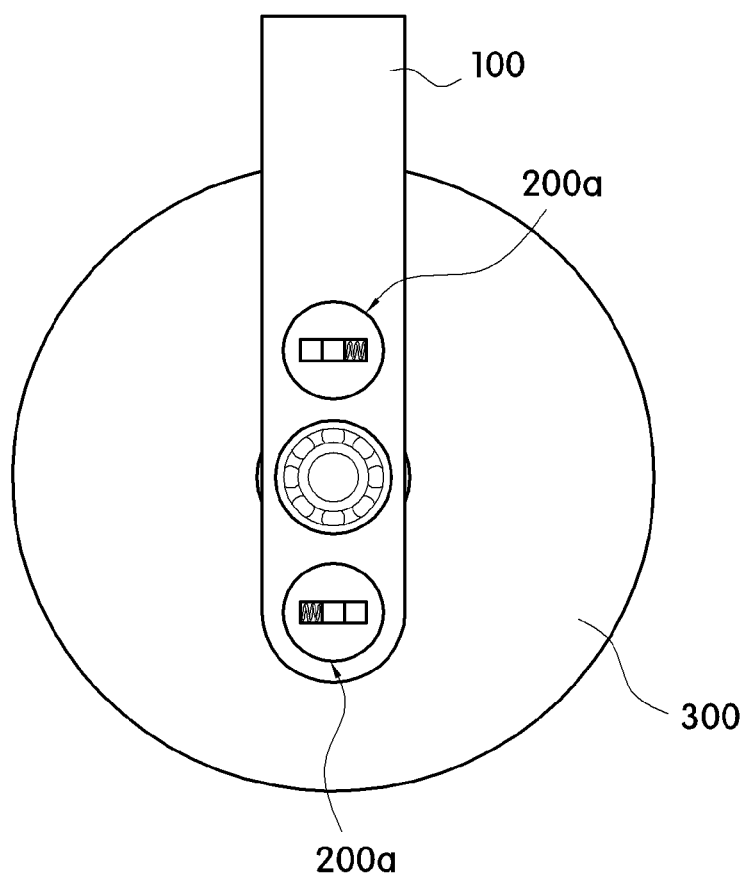
FIG. 17 is a plan view of a stiffness control apparatus according to some embodiments of the present invention including plurality of stiffness control units on both sides with respect to a main shaft.

FIG. 17 is a plan view of a stiffness control apparatus according to some embodiments of the present invention including a plurality of stiffness control units on both sides with respect to the main shaft.

In the example shown in FIG. 17, the stiffness control units are arranged on both the far side and the near side with respect to the main shaft. The structure shown in FIG. 17 is similar to the structure shown in FIG. 16; however, the structure shown in FIG. 17 has two circular holes on the inner side of the output link, while the structure shown in FIG. 15 has one circular hole on the far side and one concave portion on the near side of the output link.

Figure 18:
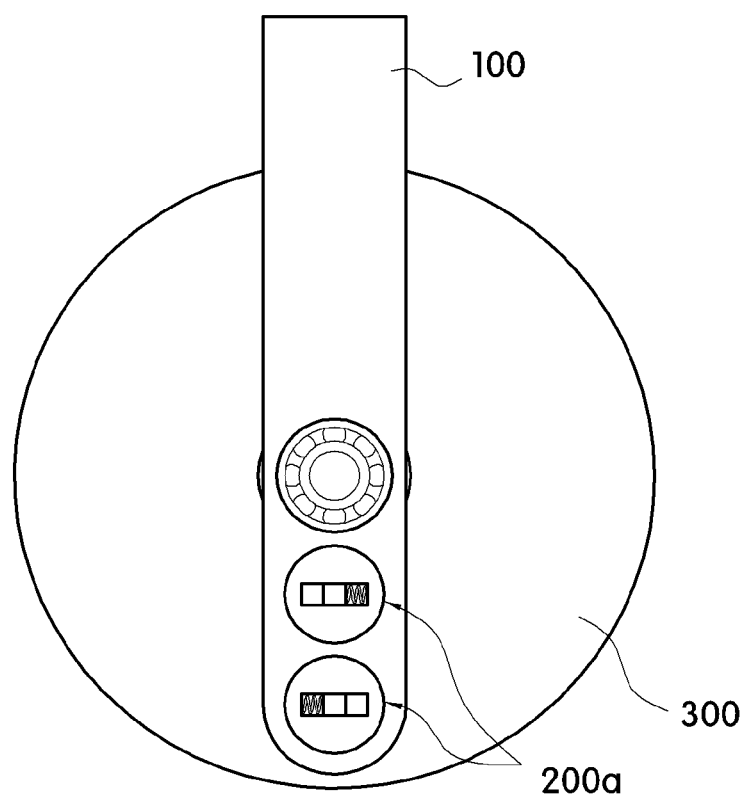
FIG. 18 is a plan view of a stiffness control apparatus according to some embodiments of the present invention including a plurality of stiffness control units at an end portion of an output link.

FIG. 18 is a plan view of a stiffness control apparatus according to some embodiments of the present invention including a plurality of stiffness control units at an end portion of the output link.

The structure shown in FIG. 18 includes a plurality of stiffness control units on the same side (near side) of the output link. By arranging a plurality of stiffness control units on the near side of the output link 100, it is possible to endure a more powerful external force.

In the embodiments described above, it is describe that the shaft and the rotating member make a relative movement that is linear. However, in practice, the output link is rotated around the main shaft to make an arc, which may draw precisely a parabolic motion. It is described in the specification and the drawings that the relative movement of the shaft and the rotating member is linear, because the moving distance is very short. Therefore, the elongated hole needs to be manufactured such that the shaft moves in a slightly curved manner depending on the size and the moving distance of the output link, which is in a range understandable by one having an ordinary skill in the pertinent art, and hence the detailed description thereof is omitted.

In some embodiments, when the output link is rotated around the main shaft, the rotating member that is pressed by the output link is rotated together with the output link to keep the relative movement of the shaft and the rotating member linear. In this case, a bearing structure (not shown) can be provided on the outer circumference of the rotating member to allow the rotating member to rotate while having contact with the output link.

Further, in the embodiments described above, although it is described that a circular-shaped stiffness control unit is inserted into a circular hole formed on the inner side of the output link, the present invention is not limited to this scheme. For instance, a square-shaped hole that circumscribes the rotating member can be formed on the inner side of the output link instead of the circular hole.

A bearing structure (not shown) can be provided on the outer circumference of the rotating member to allow the rotating member to rotate while having contact with the circular or square-shaped hole that circumscribes the rotating member. When the cross-sectional outline of the rotating member perpendicular to the shaft is polygonal, a clicking unit (not shown) can be provided on the inner wall of the circular hole to stop the rotation for each face of the polygon. In this case, the stiffness control apparatus controls the stiffness of the output link in a stepwise manner.

Although it is not expressly described in the specification, one of ordinary skill in the art would understand that the rotation of the rotating member 210 can be performed automatically by a controller (not shown) by detecting the external force applied to the output link or the type of an object to be contacted through the output link. In the same manner, all or a part of the stiffness control units can be rotated in a synchronized manner or in an independent manner depending on the situation, which can also be operated automatically by the controller.

In the case of a stiffness adjusting apparatus that does not employ the force/torque sensor, although the problem of the manufacturing cost can be solved more or less, an insertion of an additional device into the joint increases the overall volume, and response speed of the stiffness adjustment can hardly be optimized.

In the case attempting to achieve the nonlinear characteristic with respect to the variable for adjusting the stiffness, i.e., the stiffness adjustment variable by adopting the structure that simulates human muscles, although a torque can be obtained, which has the nonlinear characteristic with respect to the stiffness adjustment variable, when a position of the output side is changed with a rotational movement of the output side due to an external force, the stiffness adjustment variable for adjusting the rotational stiffness needs to be changed together in real time to keep the rotational stiffness of the output side constant, which necessitates a complicated control or a complicated structure.

As described above, the stiffness control apparatus according to some embodiments of the present invention is capable of adjusting the stiffness of the output link in a rapid and easy manner by controlling the stiffness of the output link according to the rotating angle of the rotating member. In addition, the stiffness control apparatus according to some embodiments of the present invention can be applied to both the rotational motion and the translational motion, and can be applied to an actuator structure to be used as a variable stiffness actuator, enabling a moving mechanism to perform the operation in a stable manner by effectively and easily controlling the stiffness of the output link.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill in the art would understand the scope of the claimed invention is not to be limited by the explicitly described above embodiments but by the claims and equivalents thereof.

What is claimed is:

1. An apparatus for controlling stiffness of an output link in a moving mechanism, the apparatus comprising:
   a base member;
   an output link configured to move along a plane parallel to a surface of the base member; and
   at least one stiffness control unit configured to control stiffness of the output link and including
   a shaft including a first end and a second end, the first end being rotatably coupled to the base member,
   a rotating member including an elongated hole into which the second end of the shaft is movably inserted, and rotatably arranged by the shaft at a position having contact with the output link on an outer side of the output link, and
   an elastic member between the second end of the shaft and at least one inner wall of the elongated hole in a longitudinal direction thereof.

2. The apparatus according to claim 1, wherein the rotating member is configured to move in the longitudinal direction of the elongated hole by sliding of the second end of the shaft along the elongated hole.

3. The apparatus according to claim 1, wherein
the elongated hole includes a first inner wall and a second inner wall opposite to the first inner wall with the shaft therebetween in the longitudinal direction of the elongated hole, and
the elastic member includes
a first elastic member between the first inner wall of the elongated hole and the second end of the shaft, and
a second elastic member between the second inner wall of the elongated hole and the second end of the shaft.

4. The apparatus according to claim 1, wherein the at least one stiffness control unit is configured to produce
a maximum stiffness of the output link at a first position where the elongated hole is located in a first direction parallel to a longitudinal direction of the output link by rotating the rotating member, and
a minimum stiffness of the output link at a second position where the elongated hole is located in a second direction perpendicular to the first direction by rotating the rotating member.

5. The apparatus according to claim 4, wherein the at least one stiffness control unit is configured to control the stiffness of the output link in a range from the minimum stiffness to the maximum stiffness by rotating the rotating member clockwise or counterclockwise to an arbitrary direction between the first direction and the second direction.

6. The apparatus according to claim 1, wherein
a plane of the rotating member perpendicular to the shaft is in a shape of ellipse having a major axis perpendicular to the longitudinal direction of the elongated hole, and
the least one stiffness control unit is configured to control the stiffness of the output link by rotating the rotating member in a continuous manner.

7. The apparatus according to claim 1, wherein
a plane of the rotating member perpendicular to the shaft is in a shape of circle, and
the least one stiffness control unit is configured to control the stiffness of the output link by rotating the rotating member in a continuous manner.

8. The apparatus according to claim 1, wherein
a plane of the rotating member perpendicular to the shaft is in a shape of polygon, and
the least one stiffness control unit is configured to control the stiffness of the output link by rotating the rotating member in a stepwise manner.

9. The apparatus according to claim 1, wherein
the base member includes a main shaft to which the output link is coupled, and
the main shaft of the base member and the shaft of the least one stiffness control unit are configured to cause the output link and the rotating member to move in an integrated manner.

10. The apparatus according to claim 1, wherein the output link includes at least one circular hole for accommodating the least one stiffness control unit on the inner side thereof.

11. The apparatus according to claim 1, wherein
the base member includes a rail structure configured to guide the output link and the rotating member, and
the rail structure of the base member and the shaft of the least one stiffness control unit are configured to cause the output link and the rotating member to move in an integrated manner.

12. The apparatus according to claim 1, wherein
a cross section of the second end of the shaft in a planar direction of the base member is in a shape of square, and
the rotating member is arranged in a manner that two outer surfaces of the second end of the shaft parallel to inner surfaces of the elongated hole parallel to the longitudinal direction thereof move along the inner surfaces of the elongated hole.

13. The apparatus according to claim 12, wherein the shaft includes a roller on each corner of the second end.

14. The apparatus according to claim 12, wherein
the elongated hole includes a guide structure configured to guide the shaft along the longitudinal direction thereof, and
the shaft includes a coupling structure configured to couple to the guide structure in a manner that the rotating member moves by guiding the shaft along the guide structure.

15. The apparatus according to claim 10, wherein the output link includes the at least one circular hole at a position on a far side of the main shaft.

16. The apparatus according to claim 10, wherein the output link includes the at least one circular hole at a position on a near side of the main shaft.

17. The apparatus according to claim 9, wherein the at least one stiffness control unit includes a first stiffness control unit on a first side of the output link and a second stiffness control unit on a second side of the output link along the longitudinal direction of thereof.

18. A moving mechanism of a robot, the moving mechanism comprising:
a base member;
an output link configured to move along a plane parallel to a surface of the base member;
at least one stiffness control unit configured to control stiffness of the output link, the at least one stiffness control unit including
a shaft including a first end and a second end, the first end being rotatably coupled to the base member,
a rotating member including an elongated hole into which the second end of the shaft is movably inserted and rotatably arranged by the shaft at a position having contact with the output link outside or inside the output link, and
an elastic member between the second end of the shaft and at least one inner wall of the elongated hole in a longitudinal direction thereof; and
a contact unit configured to be coupled to the output link.

19. The moving mechanism according to claim 18, wherein the contact unit includes at least one of an end effector of a robot arm, a robot hand, a robot foot, or a loading head.

20. An apparatus for controlling stiffness in a moving mechanism including a first member and a second member configured to make a relative movement with respect to the first member, the apparatus comprising:
a shaft including a first end and a second end, the first end being rotatably coupled to the first member;
a rotating member including an elongated hole into which the second end of the shaft is movably inserted, and rotatably arranged by the shaft at a position having contact with the second member on an outer side or of the second member; and an elastic member between the second end of the shaft and at least one inner wall of the elongated hole in a longitudinal direction thereof, wherein the apparatus is configured to maximize the stiffness of the second member at a first position where the elongated hole is located in a first direction perpendicular to a moving direction of the second member by blocking a movement of the second member, to allow the movement of the second member at a position where the elongated hole is located in a direction other than the first direction and to change the stiffness of the second member by a change of an elastic force of the elastic member generated by a relative movement of the shaft along the elongated hole, and to minimize the stiffness of the second member at a position where the elongated hole is located in a second direction parallel to the moving direction of the second member.

* * * * *